Patented Oct. 7, 1952

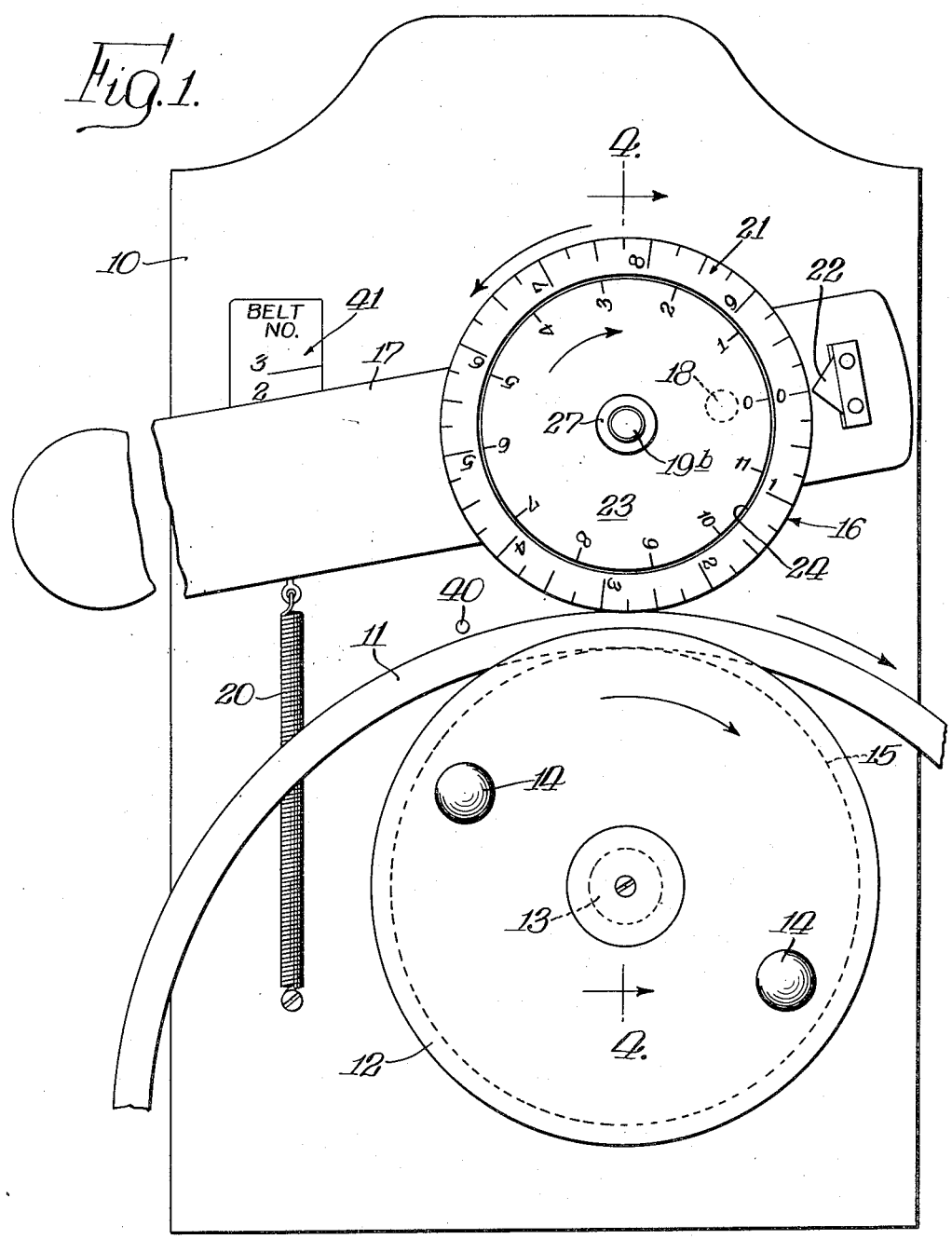

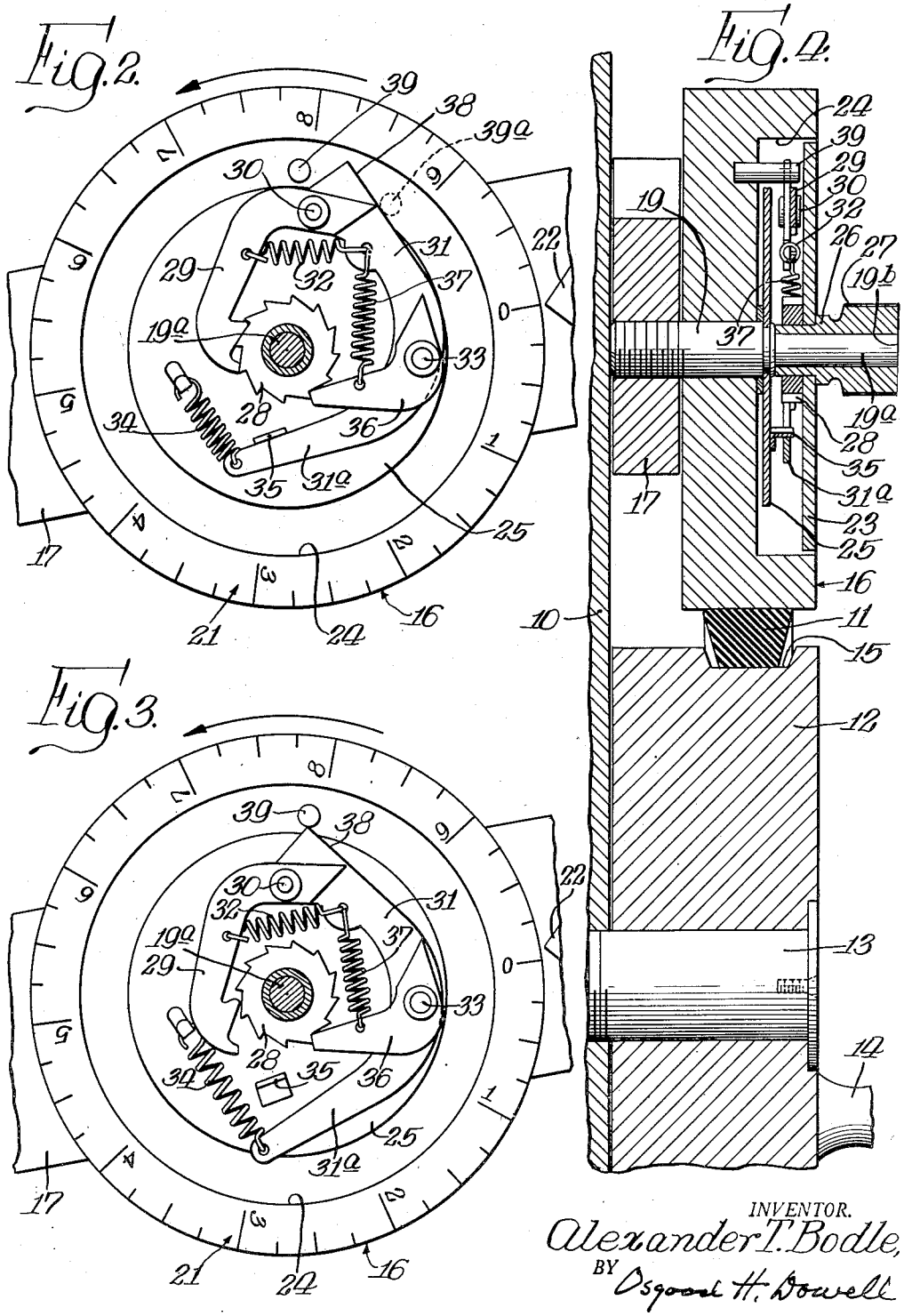

2,612,698

UNITED STATES PATENT OFFICE 2,612,698

BELT MEASURING DEVICE

Alexander T. Bodle, Mishawaka, Ind., assignor to Dodge Manufacturing Corporation, Mishawaka, Ind., a corporation of Indiana Application August 16, 1948, Serial No. 44,511

8 Claims. (Cl. 33—129)

This invention relates to devices for measuring the lengths of endless belts.

The inventor has in contemplation principally the measuring of V-belts. These are endless belts of trapezoidal cross-section for engaging in V-type belt grooves of power-transmission sheaves. The length of a V-belt is the distance around it measured on its outside surface. The majority of such belts are of lengths less than one hundred inches, though longer V-belts are employed in some power transmissions.

V-belts are made in different cross-sectional sizes which are designated commercially by numerals, letters or the like. A person ordering a V-belt of a given make should specify its length and its size designation or its thickness from which the cross-sectional size can be determined.

Objects of the present invention are to provide a simple and conveniently usable device by which the length of an endless belt can be measured with substantial accuracy or such near accuracy as to suffice for practical purposes, and to provide such a device adapted for measuring the lengths of endless V-belts and which will also indicate the thickness of the belt being measured or its size designation.

A related invention having these same objects is disclosed by the present inventor in his application Serial No. 25,247 filed May 5, 1948, now issued as Patent No. 2,545,189, granted March 31, 1951. In the device shown in that application, the belt to be measured is passed between coacting rollers one of which is a measuring roller carried by a lever yieldingly urged to press said measuring roller against the belt. Said lever also carries a star wheel in association with the measuring roller and actuated thereby to turn one step every time the measuring roller makes a complete rotation. The measuring roller has a units dial and the star wheel has a dial referred to as the tens dial. These dials cooperate with a pointer carried by said lever. The tens dial indicates the number of complete rotations made by the measuring roller in a measuring operation, and the units dial indicates the distance measured in excess of that indicated by such number of complete rotations.

The present invention is ancillary to the former and has the special object of providing an improved organization with respect to the measuring roller and associated dial mechanism. According to the present invention, the star wheel is eliminated and the tens dial is arranged concentrically with the measuring roller and actuated thereby through a pawl and ratchet mechanism contained in said roller, making a compact measuring roller unit and simplifying the machine in appearance. The actuating mechanism is such that the tens dial makes very quick step movements, each such movement occurring at about the instant when the measuring roller completes a rotation from its zero position. This is advantageous for accurate indication of measure and correct reading of the dials.

An illustrative device embodying the present invention in one practicable form is shown in the accompanying drawings, said device being of the type disclosed in said application 25,247 (now Patent No. 2,545,189) and embodying the invention claimed therein in an alternative form.

Fig. 1 is a front view of the illustrative device, showing the parts arranged in position for starting a measuring operation, the two dials of the measuring roller unit being in their zero positions.

Fig. 2 is an enlarged front view of the measuring roller unit with the tens dial removed, the parts being in the same relationship as in Fig. 1.

Fig. 3 is a view similar to Fig. 2 showing the parts in the relationship at the instant when the tens dial is about to turn one step.

Fig. 4 is a section on the line 4—4 of Fig. 1.

The illustrative device is a small compact machine having its movable parts mounted on a back plate 10 to be affixed to a wall or other convenient support at an appropriate elevation.

In the drawings, 11 denotes an endless V-belt, only partially shown.

12 is a driving pulley or roller adapted to be enclosed by and to support the belt which may hang thereon. As shown, the back plate 10 has fixed thereto and projecting therefrom a stud axle 13 on which said pulley is mounted, whereby it is supported for rotation on a horizontal axis and in such manner as to permit hanging the belt thereon and removing it therefrom. The pulley is shown equipped with a pair of diametrically arranged knobs 14 by either of which it can be manually rotated.

There is formed in the periphery of the driving pulley a shallow groove 15 in which the belt rests, said groove having a cylindrical ground and being wider than the portion of the belt therein. The beveled side walls of said groove form guide shoulders for engaging the belt in case it should tend to run out of a straight course or to wander from side to side as the pulley is rotated.

16 is a measuring roller arranged over the driving pulley 12 and coacting therewith to grip or squeeze the belt. This measuring roller is carried by a lever 17 pivoted at 18 to the back plate 10 for movement parallel with the plane of rotation of said pulley and roller. The pivot pin 18 for said lever is indicated in dotted lines in Fig. 1. The axle 19 for the measuring roller is carried by the lever 17 in fixed relation thereto, as shown in Fig. 4. A retractile spring 20 yieldingly urges said lever in a direction to press the measuring roller against the belt. The lever can be raised against the resistance of said spring to lift the measuring roller from the belt, so as to permit emplacement and removal of the belt and to permit resetting of the hereinafter described dials after a belt-measuring operation.

By rotating the driving pulley 12, the belt 11 is caused to travel between and in frictional engagement with said pulley and the measuring roller, whereby the latter is driven from said pulley in the reverse direction of rotation. The groove 15 guides the belt if guidance should be necessary, and prevents it from becoming displaced laterally from under the measuring roller.

The circumference of the measuring roller 16 equals a chosen number of standard units of linear measure, e. g. inches or centimeters. In this instance, the illustrative machine being designed for measuring in inches V-belts of ordinary lengths, the measuring roller has a circumference of exactly ten inches. If the machine were designed for measuring longer belts in feet and inches, the roller would have a circumference of preferably one foot.

Said measuring roller is provided with a units dial 21 concentric with and in fixed relation to the roller and having uniformly spaced marks denoting inches of the circumference of the roller and subdivisions thereof, the inch marks being consecutively numbered commencing with zero. A pointer 22 carried by the lever 17 cooperates with said units dial to indicate the distance measured by said roller in every complete or partial rotation thereof from its zero position.

Concentric with and surrounded by the units dial is a circular dial plate 23 rotatably mounted on an extension of the roller axle 19. Said dial plate has thereon a dial referred to as the tens dial, comprising a chosen number of digits arranged in a circular series, these digits being consecutive numbers commencing with zero. In every complete rotation of the measuring roller, the dial plate 23 is actuated by means hereinafter described to turn one step or an angular distance which is the factor of 360 degrees obtained by dividing said number of degrees by the number of said digits. In the illustrative machine, the tens dial has twelve digits and each step movement thereof is a twelfth of a revolution. Successive step movements of the dial plate brings its consecutive numbers successively opposite the pointer 22. Thus the tends dial cooperates with the pointer to counter the number of complete rotations of the measuring roller which occur in a measuring operation.

Since the measuring roller of the illustrative machine has a circumference of ten inches, the tens dial in this instance counts tens of units of measure. However the term "tens dial" as used herein is not intended to imply restriction to the counting or indication of tens of units, since as already shown the measuring roller may have a circumference of twelve inches instead of ten. The term is therefore to be understood as arbitrarily applying to a dial which in cooperation with a pointer counts the number of complete rotations of the measuring roller, whether or not the circumference thereof be equal to ten units of measure.

In the intended use of the illustrative machine, which is designed for right hand operation, the driving roller or pulley 12 is rotated in a clockwise direction, with resultant rotation of the measuring roller and units dial thereon in a counter-clockwise direction. The dial plate 23 having the tens dial thereon is turned step by step in a clockwise direction. The directions of rotation of the dials are indicated by arrows in the drawings. The units and tens dials have their digits or consecutive numbers arranged in proper respective orders to suit their respective directions of rotation.

A belt-measuring operation is commenced with the units and tens dials both at their zero positions, as shown in Fig. 1. Assuming that the belt is caused to travel in such operation the distance of its length, or until a point or mark on the belt makes a complete circuit, then upon completion of such operation the length of the belt will be indicated by the dials. That is to say, the number of complete rotations made by the measuring roller 16 will be shown by the digit of the tens dial in registration with the pointer 22, and the distance measured in excess of that so indicated, if any, will be shown by the units dial mark in registration with the pointer. For example, if the operation should bring the digit "2" of the tens dial and the digit "8" of the units dial in line with the pointer, the indicated measurement would be twenty-eight inches. Since the tens dial of the illustrative machine makes twelve step movements to complete a rotation thereof, it will be apparent that the machine as designed may be used for measuring V-belts of lengths up to one hundred and twenty inches.

As shown in Figs. 2, 3 and 4, the measuring roller 16 has a circular recess 24 closed by the dial plate 23 which may fit rotatably in said roller. Fixed on the roller axle 19 within said recess is a circular frame plate or disc 25 carrying mechanism presently to be described. The roller axle has an extension 19ª on which is rotatably fitted a tubular member or sleeve 26 carrying the dial plate 23 fixed thereon, said member being formed with a milled head or knob 27 by which the dial plate can be turned manually for setting the tens dial at zero position. Said sleeve or member 26 may be retained in place by any appropriate means, as for example, by reaming a conical hole in the end of the axle extension 19ª and swaging said end to form a retaining flange 19ᵇ.

Fixed on the sleeve 26 behind the dial plate 23 is a ratchet wheel 28 having the same number of teeth as the number of digits or dial divisions of the tens dial. Said ratchet wheel is adapted to be turned one step or the angular distance between centers of adjacent ratchet teeth by operation of a pawl 29 carried by and pivoted at 30 to a lever 31. The arrangement is such that the ratchet wheel is actuated to turn in the opposite direction to that of rotation of the measuring roller. Said pawl 29 is held in engagement with the ratchet wheel by a retractile spring 32 connecting said pawl to said lever 31. The lever 31 is pivoted on a pin 33 projecting from the frame plate or disc 25. As shown said lever has an arm 31ª held against a stop 35 on 25 by a retractile spring 34 connecting said arm to 25, whereby the lever 31 is urged to and normally held in the position shown in Fig. 2, which is the position assumed by the lever at the end of its working stroke. For actuating the ratchet wheel the lever is displaced to the position shown in Fig. 3 and returned by the spring 34 to its normal position. The ratchet wheel 28 is held from reverse rotation by a pawl or detent 36 pivoted on the pin 33 and held in engagement with the ratchet wheel by a retractile spring 37 connecting 36 and 31.

The lever 31 has a cam portion 38 projecting into the path of revolution of a pin 39 carried by the measuring roller. In every revolution of said pin it coacts with said cam to force the pawl-carrying end of the lever inwardly. The pawl 29 is thereby moved backwardly on the ratchet wheel a distance slightly greater than one tooth of the ratchet, being so moved to the position shown in Fig. 3. In this operation the ratchet wheel is held from turning by the detent 36. When the pin 39 passes from the cam 38, the lever is quickly returned to its original position by the spring 34, in which movement the pawl 29 in engagement with the ratchet wheel turns the ratchet wheel the distance of one tooth. Hence the dial plate 23 in fixed relation to the ratchet wheel is turned therewith one step. In this operation, excess movement of the ratchet wheel by momentum is prevented by the frictional engagement of the pawl teeth with the ratchet wheel. The pawl 29 is shown formed with two teeth for frictionally engaging two ratchet teeth to insure against any excess movement of the ratchet.

It will be understood that the roller axle 19, the frame plate or disc 25 fixed thereon and the pointer 22 are stationary relative to the member or lever 17 which carries the measuring roller, and that the movable parts carried by the frame plate 25 remain in their normal positions shown in Fig. 2 at all times except during the brief moments of actuation and release of the lever 31 by the revolving pin 39.

The pin 39 is fixed to the measuring roller at such a position relative to the units dial that when the zero mark of said dial is in registration with the pointer 22 the pin 39 is at a position to the left of the cam 38, as shown in Fig. 2. It will be remembered that the measuring roller of the illustrative machine rotates in a counter-clockwise direction. When the measuring roller is approaching completion of a rotation from its zero position, the pin 39 comes to the position indicated in dotted lines at 39a in Fig. 2, where the pin is about to coact with the cam 38. As the rotation of the measuring roller continues, said pin rides against the cam, forcibly displacing the lever 31 inwardly. When said pin is on the peak of said cam, as shown in Fig. 3, the lever 31 and pawl 29 carried thereby are in their extreme displaced positions, or in other words the pawl 29 is at the limit of its nonworking stroke. Now the zero mark of the units dial, having revolved from a position opposite the pointer, has very nearly returned to such position. Upon continued movement of the pin 39 only a very slight distance beyond the position shown in Fig. 3, the lever 31, being released from said pin, is very quickly or almost instantly returned to its normal position, effecting a quick working stroke of the pawl 29 to turn the ratchet wheel 28 one tooth, with consequent turning of the tens dial one step. This action is preferably timed to occur at about the instant when the zero mark of the units dial passes the pointer.

Thus in the measuring operation the digits of the tens dial are successively positioned opposite the pointer by quick rotative step movements of the dial plate 23 occurring as the zero mark of the units dial 21, in successive revolutions thereof, successively passes through a very slight angle to position in registration with the pointer. This is advantageous for accurate indication of measurement and easy and correct reading of the dials.

As shown in Fig. 1, a pin 40 projecting from the back plate 10 provides a stationary index adjacent to which a mark can be made on the belt 11 before commencing the measuring operation. In such operation the driving pulley 12 should be rotated only until such mark makes a complete circuit. This is facilitated by use of the two knobs 14. As the mark on the belt is approaching the index pin, the operator can by taking hold of both knobs control the pulley 12 very nicely, so as to continue its rotation only until said mark is returned to its original position and to stop such rotation at the right instant.

The lever 17 is utilized in cooperation with a scale 41 on the back plate to indicate thickness of the belt being measured. This scale in the form shown comprises a series of oblique lines with which the upper edge of the lever will register in different positions of the lever, indicia being printed over said lines. The scale could be graduated to denote belt thickness in inches and fractions thereof or in fractions of an inch. However, the scale shown is to indicate cross-sectional sizes of V-belts made in the so-called standard sizes which are known commercially as Nos. 1, 2 and 3. In the use of the illustrative machine for measuring such a belt, the size designation thereof will be given by the scale indicia appearing immediately over the lever.

A preferred manner of using the device is as follows:

While holding the lever 17 raised sufficiently to hold the measuring roller 16 out of the way, place the belt 11 around the driving pulley 12 and allow it to rest thereon in the groove 15. Release the lever, whereupon the tension of the spring 20 will hold the measuring roller firmly against the belt with sufficient pressure for effective gripping or squeezing of the belt between said pulley and measuring roller.

Again raise the lever sufficiently to move the measuring roller from contact with the belt, and, while holding it so raised, adjust the tens dial plate 23 and the measuring roller 16 to their zero positions, i. e. with the zero marks of their dials in line with the pointer 22, then lower and release the lever, so that the measuring roller will again rest on the belt.

Now read on the scale 41 the indicia of belt thickness or cross-sectional size appearing nearest the lever.

Put a mark on the belt adjacent to the index 49. Now rotate the driving pulley 12 in a clockwise direction, by use of either of the knobs or handles 14, until the mark on the belt is brought nearly back to its original position. Then with a turn of the right hand, while pressing with the thumb and middle finger against the two knobs 14, continue such rotation of said pulley until said mark on the belt is brought to its original position.

The length of the belt will now be indicated as hereinbefore explained. That is to say, the number of complete rotations made by the measuring roller will be indicated by the digit of the tens dial in line with the pointer, and the measurement in excess of that so indicated will be shown by the mark on the units dial 21 opposite said pointer.

Obviously the design and details of the illustrative device may be variously changed to suit different requirements and conditions.

I claim:

1. A belt measuring device comprising a pulley adapted to be enclosed by and to support an endless belt, a measuring roller coactive with said pulley to grip the belt, a lever carrying said roller and yieldingly urged to press it against the belt, a back plate carrying said pulley and having said lever pivoted thereto for movement parallel with the plane of rotation of said roller, the said roller being in front of said lever and having on its front face an annular units dial and having a concentric circular recess open at said face, an independently rotatable dial plate fitted in said recess and having on its front face a tens dial in substantially the same plane as the surrounding units dial, mechanism contained in said recess and controlled by said roller for turning said tens dial one step in each complete rotation of said roller, and a pointer carried by and in fixed relation to said lever with which said dials cooperate, said tens dial cooperating with said pointer to show the number of complete rotations of said roller resulting from travel of the belt for the distance of its length between and in frictional engagement with said pulley and roller, and said units dial cooperating with said pointer to show the distance measured by said roller in excess of that indicated by said number of complete rotations.

2. A measuring device according to claim 1 wherein said mechanism comprises a ratchet wheel rotatably mounted on said axle and carrying said dial plate in fixed relation thereto, a pawl for actuating said ratchet wheel, a lever carrying said pawl and spring-actuated to a normal position, in which position the lever is at the limit of its working stroke, a support for said lever carried by and in fixed relation to said axle, and means whereby said roller in every complete rotation thereof from zero position displaces and suddenly releases said lever with resultant spring actuation of said ratchet wheel on the return movement of said lever.

3. A measuring device according to claim 1 wherein said mechanism comprises a ratchet wheel rotatably mounted on said axle and carrying said dial plate in fixed relation thereto, a pawl for actuating said ratchet wheel, a lever carrying said pawl, a spring impelling said lever to a normal position, in which position the lever is at the limit of its working stroke, a support for said lever carried by and in fixed relation to said axle, said roller having an element fixed to and revolving therewith and said lever having a cam projecting into the path of revolution of said element, whereby in each complete rotation of said roller from its zero position said element coacts with said cam to displace said lever against resistance of said spring and then quickly releases it, the arrangement being such that by displacement of said lever said pawl is moved relative to said ratchet wheel in the reverse direction to that for actuating it and to a position such that on return movement of said lever when released the pawl turns the ratchet wheel one step.

4. In a measuring device of the class described, the combination of a measuring roller having on its face an annular units dial, said roller having a concentric circular recess surrounded by said units dial, a carrier having fixed thereto an axle on which said roller rotates, a tens dial rotatable on said axle and rotatably fitted in said recess, mechanism carried by said axle within said recess for turning the tens dial one step on every complete rotation of said roller, and a pointer fixed to said carrier and cooperating with said dials as and for the purpose described.

5. In a measuring device of the class described, the combination of a measuring roller having thereon a units dial, a carrier having fixed thereto an axle on which said roller rotates, a tens dial rotatably mounted on said axle, a pointer fixed to said carrier and cooperating with said dials, and pawl-and-ratchet mechanism carried by said axle and controlled by said roller for actuating said tens dial, said mechanism including a pawl-carrying lever spring actuated to a normal position in which the lever is at the limit of its working stroke, and coactive camming means on said roller and lever for forcing the lever against spring resistance to position to commence its working stroke, the mechanism being constructed and operating to effect a quick turning of the tens dial by spring action one step at about the instant when the measuring roller completes a rotation from its zero position, said lever being arranged transversely of radial lines to swing inwardly and outwardly toward and away from the ratchet, the pawl being pivoted to the swinging end of said lever, a retractile spring connecting said pawl and lever for forcing the pawl against the ratchet, the frictional engagement of the pawl with the ratchet at the end of the working stroke of the pawl being such as to prevent excess turning of the ratchet by momentum.

6. In a measuring device of the class described, the combination of a measuring roller having thereon a units dial, a carrier having fixed thereto an axle on which said roller rotates, a tens dial rotatably mounted on said axle, a pointer fixed to said carrier and cooperating with said dials, and mechanism carried by said axle and controlled by said roller for turning the tens dial one step on every complete rotation of said roller, said mechanism comprising a ratchet wheel rotatable on said axle and having said tens dial fixed thereto for rotation therewith, a pawl engaging said ratchet wheel, a lever carrying said pawl, means limiting movement of said lever in the direction of its working stroke, a spring forcing said lever to a position at the limit of its working stroke, a pin fixed to and revolving with said roller, a cam on said lever in the path of revolution of said pin whereby in every revolution of said roller the lever is forced against resistance of said spring to a position to commence its working stroke, said cam terminating abruptly at its highest point so that when the pin passes said point the lever is released and spring actuated to turn the ratchet wheel, the release of said lever for spring-actuation being timed to occur at about the instant when the measuring roller completes a rotation from its zero position.

7. In a measuring device comprising a measuring roller having a concentric circular recess and a surrounding units dial and an independently rotatable tens dial fitted in said recess and a carrier having fixed thereto an axle on which said roller rotates and a pointer arranged for cooperation with said dials, the herein described snap-action mechanism contained in said recess behind said tens dial and controlled by said roller for turning said tens dial one step on every complete rotation of said roller from its zero position, said mechanism comprising a ratchet rotatably mounted on said axle and carrying said tens dial, a pawl for actuating said ratchet, a lever carrying said pawl, a support for said lever carried by and in fixed relation to said axle, said ratchet being between said pawl and pivot of said lever, said lever being arranged transversely of radial lines for movement inwardly and outwardly toward and away from the ratchet, the pawl being pivoted to the swinging end of said lever and operated in the direction for turning the ratchet by outward movement of said lever, a retractile spring connecting said pawl and lever for forcing the pawl against the ratchet, means limiting outward movement of said lever, a spring impelling said lever to its outermost position, a pin fixed to and revolving with said roller, and a cam on said lever in the path of revolution of said pin whereby in every revolution of said roller the lever is forced inwardly against resistance of said spring to a position to commence its working stroke, said cam terminating abruptly at its highest point so that when the pin passes said point the lever is suddenly released and spring actuated to turn the ratchet.

8. In a measuring device comprising a measuring roller having a concentric circular recess and a surrounding units dial and an independently rotatable tens dial fitted in said recess and a carrier having fixed thereto an axle on which said roller rotates and a pointer arranged for cooperation with said dials, the herein described snap-action mechanism contained in said recess behind said tens dial and controlled by said roller for turning said tens dial one step on every complete rotation of said roller from its zero position, said mechanism comprising a ratchet rotatably mounted on said axle and carrying said tens dial, a pawl for actuating said ratchet, a lever carrying said pawl, a support for said lever carried by and in fixed relation to said axle, said ratchet being between said pawl and pivot of said lever, said lever being arranged transversely of radial lines for movement inwardly and outwardly toward and away from the ratchet, the pawl being pivoted to the swinging end of said lever and operated in the direction for turning the ratchet by outward movement of said lever, means limiting outward movement of said lever, a spring impelling said lever to its outer position, a cam on said lever, means on said roller which in every revolution thereof coacts with said cam to displace and suddenly release said lever for spring actuation to turn the ratchet the distance of one tooth, means to prevent reverse rotation of said ratchet, a retractile spring connecting said pawl and lever to force the pawl against the ratchet, said pawl having two teeth which when the pawl is at the limit of its working stroke bear against the inclined surfaces of two adjacent ratchet teeth to prevent excess turning of the ratchet by momentum.

ALEXANDER T. BODLE.

REFERENCES CITED

The following references are of record in the file of this patent:

UNITED STATES PATENTS

| Number | Name | Date |
|---|---|---|
| 52,378 | Denham | Feb. 6, 1866 |
| 100,425 | Luckett | Mar. 1, 1870 |
| 297,706 | Morrison | Apr. 29, 1884 |
| 423,786 | Lowenthal | Mar. 18, 1890 |
| 550,764 | Rogers | Dec. 3, 1895 |
| 1,172,052 | Rush | Feb. 15, 1916 |
| 1,225,223 | Davis | May 8, 1917 |
| 1,391,431 | Turner | Sept. 20, 1921 |
| 1,624,633 | Spoerri | Apr. 12, 1927 |
| 1,759,992 | McCarthy | May 27, 1930 |
| 2,269,650 | Cooney | Jan. 13, 1942 |
| 2,423,991 | Mumma | July 15, 1947 |